US008833507B2

(12) United States Patent
Sekikawa et al.

(10) Patent No.: US 8,833,507 B2
(45) Date of Patent: Sep. 16, 2014

(54) MOTOR-DRIVEN POWER STEERING APPARATUS

(75) Inventors: Shinsuke Sekikawa, Tochigi (JP); Koichi Okamoto, Tochigi (JP); Masakazu Shinozaki, Tochigi (JP); Naomasa Watanabe, Tochigi (JP); Tsukasa Suzuki, Tochigi (JP); Masanobu Miyazaki, Tochigi (JP)

(73) Assignee: Showa Corporation (JP)

( * ) Notice: Subject to any disclaimer, the term of this patent is extended or adjusted under 35 U.S.C. 154(b) by 234 days.

(21) Appl. No.: 13/430,510

(22) Filed: Mar. 26, 2012

(65) Prior Publication Data

US 2013/0075189 A1  Mar. 28, 2013

(30) Foreign Application Priority Data

Sep. 28, 2011 (JP) .................. 2011-213358

(51) Int. Cl.
*B62D 5/04* (2006.01)
*F16H 57/039* (2012.01)
*F16H 57/021* (2012.01)
*F16H 57/12* (2006.01)
*F16H 57/022* (2012.01)

(52) U.S. Cl.
CPC ............ *F16H 57/039* (2013.01); *B62D 5/0409* (2013.01); *F16H 2057/0213* (2013.01); *F16H 2057/127* (2013.01); *F16H 2057/0222* (2013.01)

USPC ........................................... 180/443; 180/444

(58) Field of Classification Search
CPC ............................... B62D 5/0409; B62D 5/04
USPC ................. 180/443, 444; 74/425, 388 PS
See application file for complete search history.

(56) References Cited

U.S. PATENT DOCUMENTS

| 7,360,467 B2 * | 4/2008 | Segawa et al. ............ 74/425 |
| 8,443,929 B2 * | 5/2013 | Suzuki et al. ............ 180/444 |
| 2010/0243367 A1 * | 9/2010 | Suzuki et al. ............ 180/444 |

FOREIGN PATENT DOCUMENTS

| EP | 1225116 A2 | 1/2002 |
| JP | 2002067992 A | 3/2002 |
| JP | 2003004105 A | 1/2003 |
| JP | 2003301890 A | 10/2003 |
| JP | 3646205 | 5/2005 |

* cited by examiner

*Primary Examiner* — Joseph M Rocca
*Assistant Examiner* — Jacob Knutson
(74) *Attorney, Agent, or Firm* — Keith H. Orum; Orum & Roth, LLC

(57) ABSTRACT

In a motor-driven power steering apparatus having a preload means which energizes a bearing of a worm gear in a predetermined preload direction, the preload means has a guide case as well as having a bearing case, and the guide case accommodating the bearing case in which the bearing and a spring are accommodated is attached to an attaching portion which is provided in a gear housing.

20 Claims, 9 Drawing Sheets

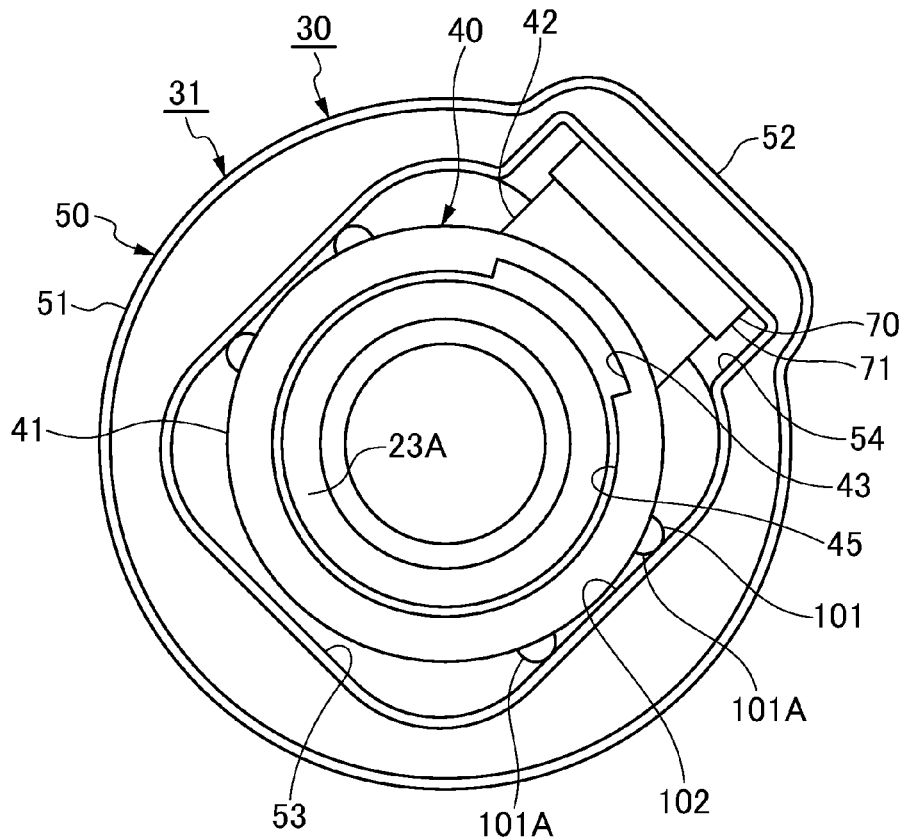
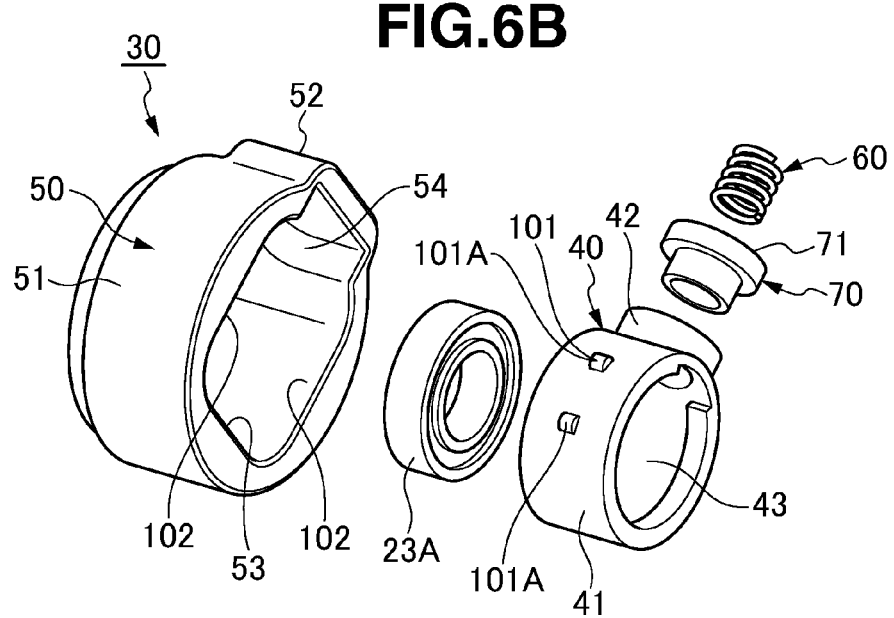

MOTOR-DRIVEN POWER STEERING APPARATUS

BACKGROUND OF THE INVENTION

1. Field of the Invention

The present invention relates to a motor-driven power steering apparatus.

2. Description of the Related Art

In the motor-driven power steering apparatus, a pinion shaft connected to a steering shaft via a torsion bar is pivoted to a gear housing. A rack shaft engaging with the pinion shaft is supported to the gear housing so as to be linearly movable, and a worm gear connected to a drive shaft of an electric motor is pivoted to the gear housing. A worm wheel is fixed to an intermediate portion of the pinion shaft so as to be engaged with the worm gear is pivoted to the gear housing. The electric motor is structured such as to apply a steering assist torque in correspondence to a steering torque which a driver applies to the steering shaft to the rack shaft via an engagement between the worm gear and the worm wheel, and an engagement between the pinion shaft and the rack shaft.

In the motor-driven power steering apparatus mentioned above, it is necessary to easily set a center distance between the worm gear and the worm wheel without being affected by a dimensional error of a part such as a worm gear, at a time of assembling, and easily adjust the center distance in the case that the engagement between the worm gear and the worm wheel is changed with age after the assembling, thereby removing a backlash thereof.

In the motor-driven power steering apparatus described in Japanese Patent No. 3646205 (Patent document 1), it has a preload means which energizes a bearing supporting a leading end shaft portion of the worm gear in a predetermined preload direction in such a manner as to apply a preload to the engagement portion between the worm gear and the worm wheel. On the basis of an energizing force of the preload means, the center distance between the worm gear and the worm wheel is adjusted, and the backlash thereof is removed.

The preload means described in Japanese Patent No. 3646205 is structured such that a guide case accommodates a bearing and is provided with a guide surface guiding in such a manner that the bearing moves in the predetermined preload direction is fitted to a fitting hole of the gear housing. An adjusting screw is threadably attached to a retaining hole provided in the gear housing, and a coil spring backed up by the adjusting screw is inserted thereinto. Further, a pressing body pressed by the coil spring is inserted into a hole which is provided in the guide case, and is structured such as to energize the bearing within the guide case in the predetermined preload direction. In this case, the adjusting screw is threadably attached to a lock nut for preventing it from slacking.

In the motor-driven power steering apparatus described in Japanese Patent No. 3646205, each of the parts including the guide case, the adjusting screw, the coil spring, the pressing body and the lock nut constructing the preload means is individually embedded in the fitting hole and the retaining hole of the gear housing, and an assembling characteristic is not good.

SUMMARY OF THE INVENTION

An object of the present invention is to improve an assembling characteristic of a preload means with respect to a gear housing, in a motor-driven power steering apparatus having a preload means for removing a backlash between a drive gear and a driven gear.

In accordance with one embodiment of the present invention, there is provided a motor-driven power steering apparatus comprising a drive gear driven by an electric motor, the drive gear being pivoted to a gear housing. A driven gear engages with the drive gear, the driven gear being fixed to a steering shaft. A preload means energizes a bearing of the drive gear in a predetermined preload direction in such a manner as to apply a preload to an engagement portion between the drive gear and the driven gear. The preload means comprises a bearing case which is provided with a bearing accommodating hole accommodating the bearing of the drive gear and is provided with a spring accommodating hole accommodating a spring for energizing the bearing so as to cross the bearing accommodating hole. It is also provided in an outer periphery with a guided portion. A guide case is provided with a guide hole accommodating the bearing case, and is provided in an inner periphery of the guide hole with a guide surface coming into contact with the guided portion of the bearing case and guiding in such a manner that the bearing case moves in a predetermined preload direction of the bearing. The guide case accommodating the bearing case in which the bearing and the spring are accommodated is attached to an attaching portion which is provided in the gear housing.

In accordance with another embodiment of the present invention, the bearing case is made of plastic, and the guide case is made of metal.

In accordance with another embodiment of the present invention, a positioning portion for the guide case is provided in the attaching portion of the gear housing. A positioned portion provided in the guide case is engaged with the positioning portion, and a guide direction of the bearing case by the guide case is set to the predetermined preload direction of the bearing by positioning the attaching position of the guide case with respect to the attaching portion of the gear housing.

In accordance with another embodiment of the present invention, two flat surface shaped guide surfaces which are opposed to each other so as to be in parallel are provided in the inner periphery of the guide hole of the guide case. Each the guided portions of the bearing case come into contact with each of the guide surfaces of the guide case, constructed by two convex portions which are adjacent to each other along the preload direction of the bearing.

In accordance with another embodiment of the present invention a tubular bump stopper rubber is loaded to the spring accommodating hole of the bearing case. The bump stopper rubber is structured such as to be retainable between a receiving surface which is provided around the spring accommodating hole of the bearing case and a receiving surface which is provided in the inner periphery of the guide case. A spring is accommodated in an inner diameter portion of the bump stopper rubber.

In accordance with another embodiment of the present invention, the spring is constructed by a coil spring.

In accordance with another embodiment of the present invention, between the attaching portion of the gear housing and the guide case, there are provided a diametrical direction pressing means which presses the guide case in a diametrical direction so as to define a position in a diametrical direction of the guide case, and an axial direction pressing means which presses the guide case in an axial direction so as to define a position in an axial direction of the guide case.

In accordance with another embodiment of the present invention, the diametrical direction pressing means and the axial direction pressing means are constructed by an O-ring.

In accordance with another embodiment of the present invention, the bearing case is constructed approximately as a cylinder body. The convex portion is formed as a circular cylinder surface shape which is extended over a whole width of the cylinder body along the axial direction of the cylinder body on an outer periphery of the cylinder body in the bearing case.

In accordance with another embodiment of the present invention, the bearing case is constructed approximately as a cylinder body, and wherein the convex portion is formed as a short circular cylinder surface shape which is provided only in the center in the width direction of the cylinder body on an outer periphery of the cylinder body in the bearing case.

In accordance with another embodiment of the present invention, the bearing case is constructed approximately as a cylinder body, and wherein the convex portion is formed as a spherical shape which is provided in the center in the width direction of the cylinder body on an outer periphery of the cylinder body in the bearing case.

In accordance with the present embodiment, the following operations and effects can be achieved.

(a) The preload means has the bearing case and the guide case. The bearing case is provided with the bearing accommodating hole which accommodates the bearing of the drive gear, is provided with the spring accommodating hole which accommodates the spring for energizing the bearing so as to cross the bearing accommodating hole, and is provided in the outer periphery with the guided portion. The guide case is provided with the guide hole which accommodates the bearing case, and is provided in the inner periphery of the guide hole with the guide surface which comes into contact with the guided portion of the bearing case so as to guide in such a manner that the bearing case moves in the predetermined preload direction of the bearing. Further, the guide case accommodating the bearing case in which the bearing and the spring are accommodated is attached to the attaching portion which is provided in the gear housing.

In other words, the preload means is previously arranged in a state of the sub assembly that the bearing case in which the bearing and the spring are accommodated is accommodated in the guide case. An assembly is completed by attaching the guide case in the state of the sub assembly to the attaching portion of the gear housing, whereby an assembling characteristic can be improved.

Since the spring is accommodated in the spring accommodating hole of the bearing case, it is possible to form the sub assembly in which the spring is stably embedded without any risk of falling. Further, it is possible to accommodate the spring having a large dimension while making a whole structure of the preload means small in diameter and compact in size, by structuring the spring such as to come into direct contact with the bearing and energize. It is possible to hold down a deformation of the bearing case at such a degree that the spring does not press the bearing via the bearing case and improve a durability thereof.

(b) The bearing case is made of plastic, and the guide case is made of metal. In accordance with this, it is possible to improve a sliding performance of the guided portion of the bearing case with respect to the guide surface of the guide case.

(c) The guide direction of the bearing case by the guide case is set to the predetermined preload direction of the bearing by providing the positioning portion for the guide case in the attaching portion of the gear housing, engaging the positioned portion provided in the guide case with the positioning portion, and positioning the attaching position of the guide case with respect to the attaching portion of the gear housing. In accordance with this, it is possible to energize the bearing of the drive gear in the predetermined preload direction while easily setting the assembling direction of the preload means with respect to the gear housing.

(d) Two flat surface shaped guide surfaces which are opposed to each other so as to be in parallel are provided in the inner periphery of the guide hole of the guide case. Each of the guided portions of the bearing case which comes into contact with each of the guide surfaces of the guide case is constructed by two convex portions which are adjacent to each other along the preload direction of the bearing. Since two points constructed by the respective two convex portions (respective guided portions) in both sides of the bearing case come into contact with the respective flat surface shaped guide surfaces in both sides of the guide case so as to be guided, the bearing case is prevented from turning around its own axis with respect to the guide case, and the bearing of the drive gear can be stably energized in the predetermined preload direction without any centrifugal whirling or any abnormal noise.

Further, the convex portion (guided portion) of the bearing case is brought into contact with the flat surface shaped guide surface of the guide case so as to be guided, and a generation of the abnormal noise is suppressed by making the gap between the guided portion and the guide surface small. At the same time, friction between the guided portion and the guide surface is made smaller by setting the number of the convex portions coming to the guided portion of the bearing case to two in one side, and suppressing a surface pressure between the guided portion and the guide surface from becoming too large, whereby it is possible to lightly move and guide the bearing case with respect to the guide case on the basis of the spring force of the spring.

(e) The tubular bump stopper rubber is loaded to the spring accommodating hole of the bearing case. The bump stopper rubber can be retained between the receiving surface which is provided around the spring accommodating hole of the bearing case and the receiving surface which is provided in the inner periphery of the guide case. When the steering reaction force serving as the inverse input caused by collision of the wheel at a curb or the like is going to shockingly make the driven gear and the drive gear engaging with the driven gear displace in the radial direction, the bump stopper rubber can elastically absorb the displacement and reduce the shock.

At this time, it is possible to make a whole structure of the preload means small in diameter and compact in size by accommodating the spring in the inner diameter portion of the bump stopper rubber.

(f) In the case that the spring accommodated in the inner diameter portion of the bump stopper rubber in the item (e) mentioned above is constructed by the coil spring, it is possible to make a whole structure of the preload means using the coil spring small in diameter and compact in size.

(g) Between the attaching portion of the gear housing and the guide case, there are provided with the diametrical direction pressing means which presses the guide case in the diametrical direction so as to define the position in the diametrical direction of the guide case, and the axial direction pressing means which presses the guide case in the axial direction so as to define the position in the axial direction of the guide case. In accordance with this, it is possible to easily attach the guide case to the attaching portion of the gear housing with no play.

(h) Since the diametrical direction pressing means and the axial direction pressing means in the item (g) mentioned above are constructed by the O-ring, it is possible to further simplify the attaching structure of the guide case.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings:

FIG. 4A and FIG. 4B show a joint structure of the worm gear, in which FIG. 4A is a perspective view showing a sub assembly state and FIG. 4B is a perspective view showing constructing parts;

FIG. 6A and FIG. 6B show the preload means, in which FIG. 6A is a front elevational view showing a sub assembly state and FIG. 6B is a perspective view showing constructing parts;

FIG. 8A to FIG. 8C show a bearing case, in which FIG. 8A is a perspective view, FIG. 8B is a front elevational view and FIG. 8C is a side elevational view; and FIG. 9A to FIG. 9C show a bearing case, in which FIG. 9A to FIG. 9C are perspective views showing modified examples thereof.

DESCRIPTION OF THE PREFERRED EMBODIMENTS

Figure 1:
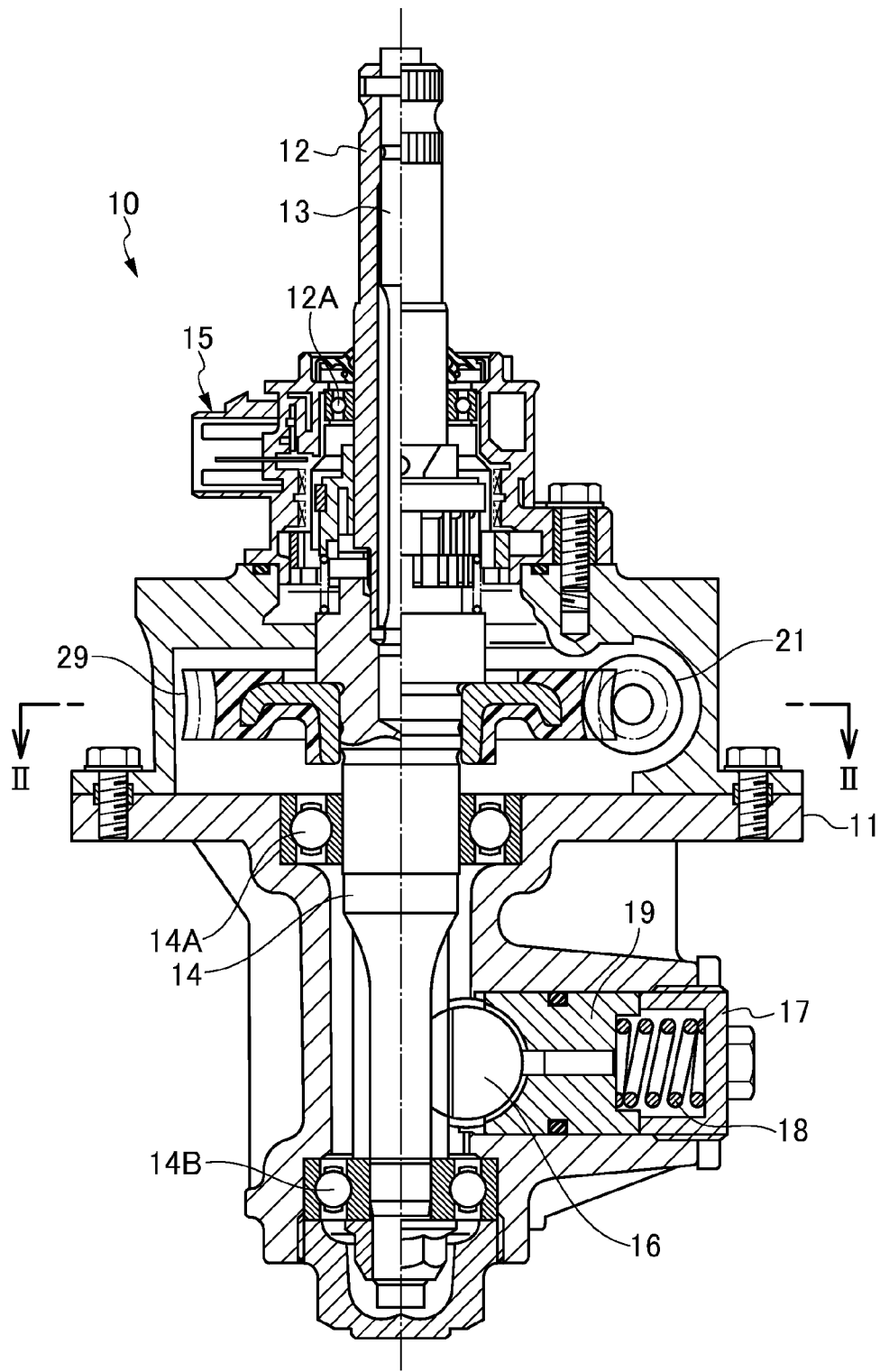
FIG. 1 is a vertical cross sectional view showing a motor-driven power steering apparatus.
Figure 2:
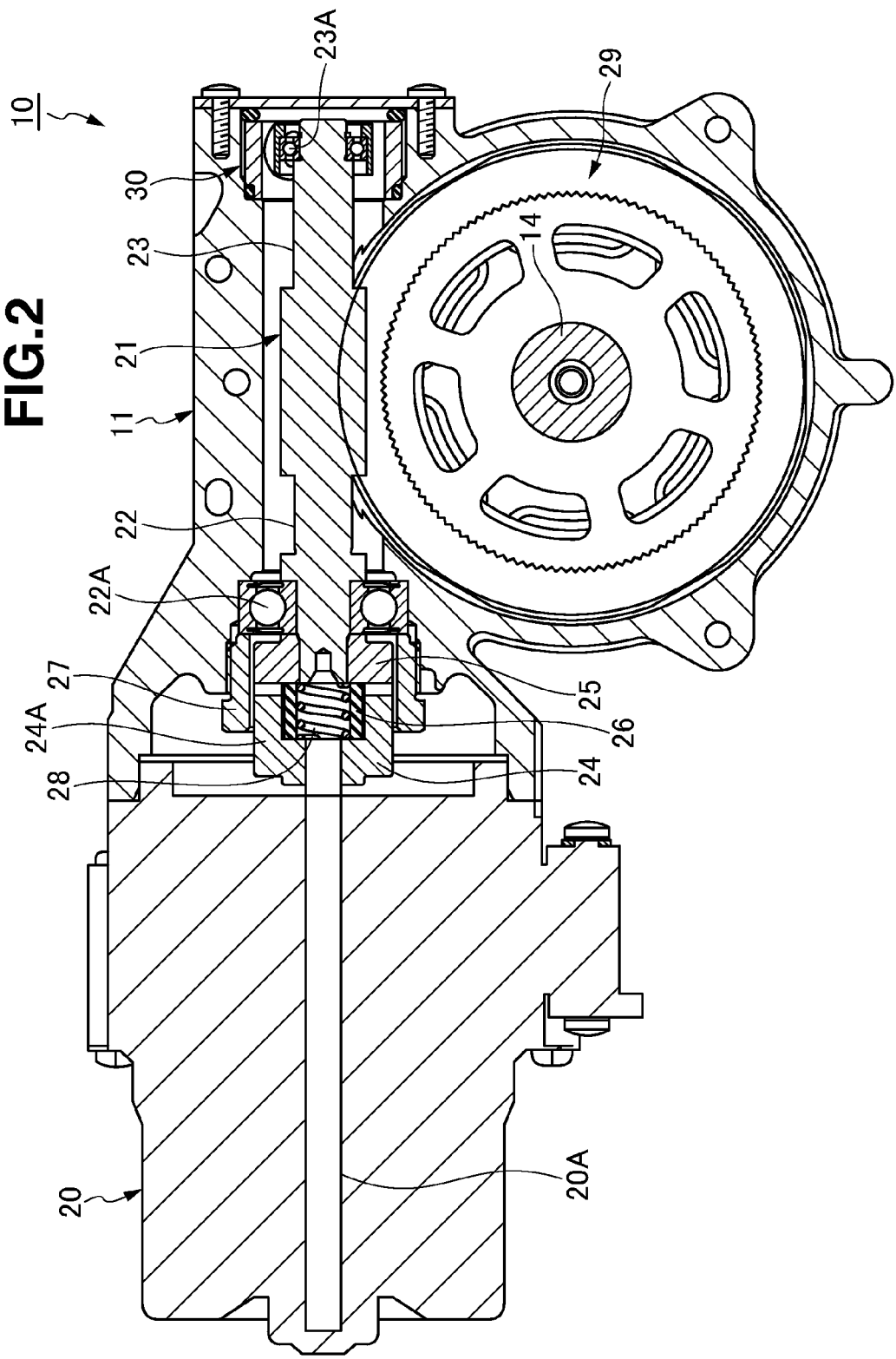
FIG. 2 is a cross sectional view along a line II-II in FIG. 1.

A motor-driven power steering apparatus 10 has a gear housing 11 which is fixed to a vehicle body by a bracket which is not illustrated, as shown in FIG. 1 and FIG. 2. Further, an output shaft 14 (a steering shaft) is connected to an input shaft 12 to which a steering wheel (not illustrated) is connected, via a torsion bar 13. A torque sensor 15 is embedded within the gear housing 11, the torque sensor 15 detecting a steering torque which a driver applies to the steering wheel, on the basis of a relative rotational displacement amount between the input shaft 12 and the output shaft 14 in correspondence to a torsion of the torsion bar 13. The input shaft 12 and the output shaft 14 are pivoted to the gear housing 11 via bearings 12A, 14A and 14B.

A rack shaft 16 provided with a rack engaging with a pinion of the output shaft 14 is supported to the gear housing 11 so as to be linearly movable right and left. In this case, a rack guide 19 is embedded in a portion which is opposed to a pinion of the output shaft 14 while sandwiching one end of the rack shaft 16 within the gear housing 11, the rack guide 19 being pressed to the rack shaft 16 by a spring 18 which is supported its back face by a cap 17.

Figure 3:
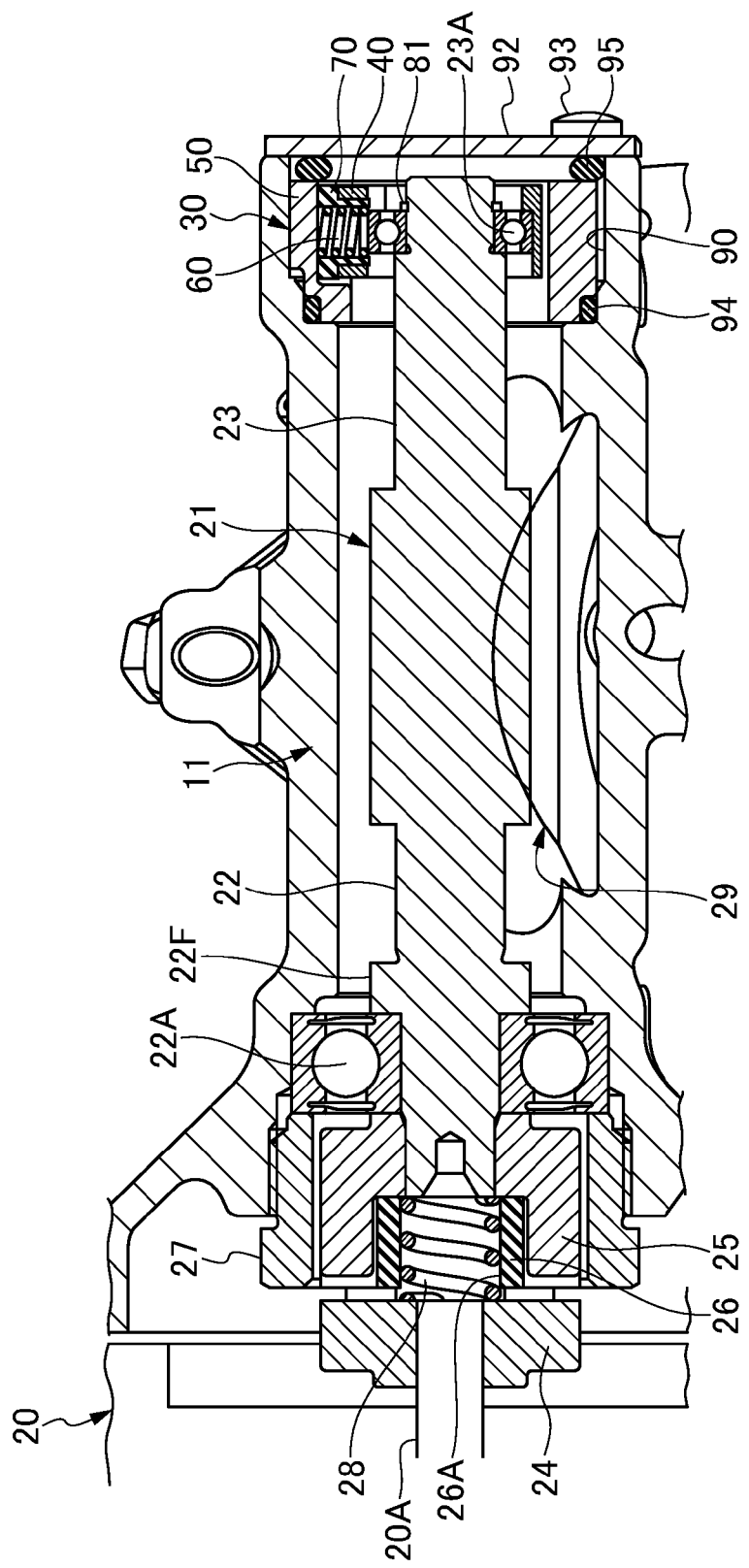
FIG. 3 is a cross sectional view showing a support structure of a worm gear.
Figure 4A:
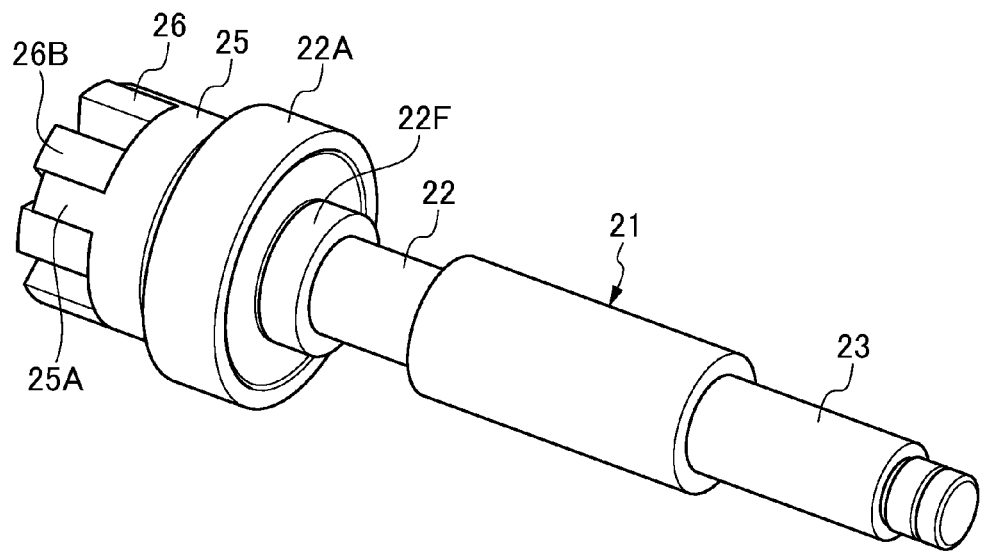
Figure 4B:
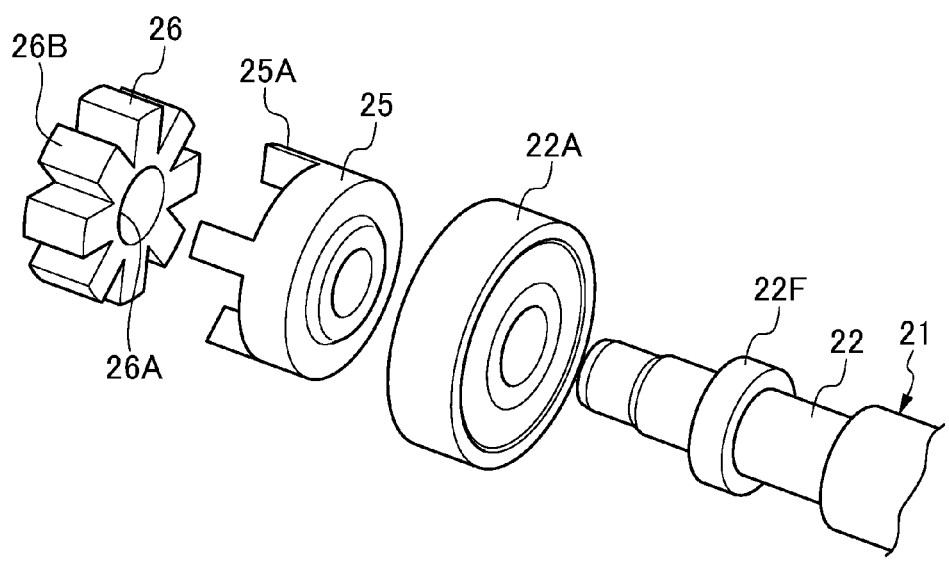

An electric motor 20 is fixed to the gear housing 11. Shaft portions 22 and 23 in both ends of a worm gear 21 (a drive gear) which is connected to the electric motor 20 so as to be driven are pivoted to the gear housing 11 via bearings 22A and 23A in such a manner as to intersect an axis of the output shaft 14, that is, be orthogonal in the present embodiment, as shown in FIG. 3. A coupling 24 is pressed into a drive shaft 20A of the electric motor 20, a coupling 25 is pressed into the shaft portion 22 of the worm gear 21, and the coupling 24 and the coupling 25 are connected by a rubber joint 26 made of an ethylene propylene rubber or the like, as shown in FIG. 4A and FIG. 4B. The rubber joint 26 has a rubber elasticity, and is provided with a projection portion 26B which is formed as a radial shape in an outer periphery of an annular hollow core 26A. A blade portion 24A of the coupling 24 and a blade portion 25A of the coupling 25 are fitted to an opposed gap of the projection portions 26B which are adjacent in a peripheral direction of the rubber joint 26 in this order, and a rotating force of the electric motor 20 is transmitted to the worm gear 21 via the rubber joint 26.

At this time, as shown in FIG. 3, an outer ring of the bearing 22A for the shaft portion 22 of the worm gear 21 is fixed to a step hole of the gear housing 11 by a bearing nut 27 which is threadably attached to the gear housing 11. An inner ring of the bearing 22A is pinched by a flange 22F which is provided in the shaft portion 22 of the worm gear 21, and a coupling 25 which is pressed into the shaft portion 22. In accordance with this, the worm gear 21 is supported to the gear housing 11 with no play in an axial direction. Further, the worm gear 21 can somewhat oscillate around a position in the vicinity of a center in a width direction of the bearing 22A on the basis of an elasticity of the rubber joint 26. The oscillation of the worm gear 21 is absorbed by an elastic deformation of the rubber joint 26. Further, a spring which is loaded in a hollow portion of the hollow core 26A of the rubber joint 26, that is, a compression coil spring 28 in the present embodiment is loaded in a compressed state between an end surface of the coupling 24 and an end surface of the shaft portion 22 of the worm gear 21, and absorbs a vibration which can be generated in an axial direction of the worm gear 21.

A worm wheel 29 (driven gear) which engages with the worm gear 21 driven by the electric motor 20 is fixed to an intermediate portion of the output shaft 14. The electric motor 20 is driven in correspondence to the steering torque which the torque sensor 15 detects. The torque of the electric motor 20 is transmitted to the output shaft 14 via the engagement portion between the worm gear 21 and the worm wheel 29, is further applied as a steering assist force to the rack shaft 16, and assists the steering torque which the driver applies to the steering wheel.

Accordingly, in the motor-driven power steering apparatus 10, in order to remove a backlash in the engagement portion between the worm gear 21 and the worm wheel 29, it has a preload means 30 applying a preload to the engagement portion between the worm gear 21 and the worm wheel 29. The preload means 30 energizes a bearing 23A which is provided in the shaft portion 23 of the worm gear 21 in a predetermined preload direction.

Figure 5:
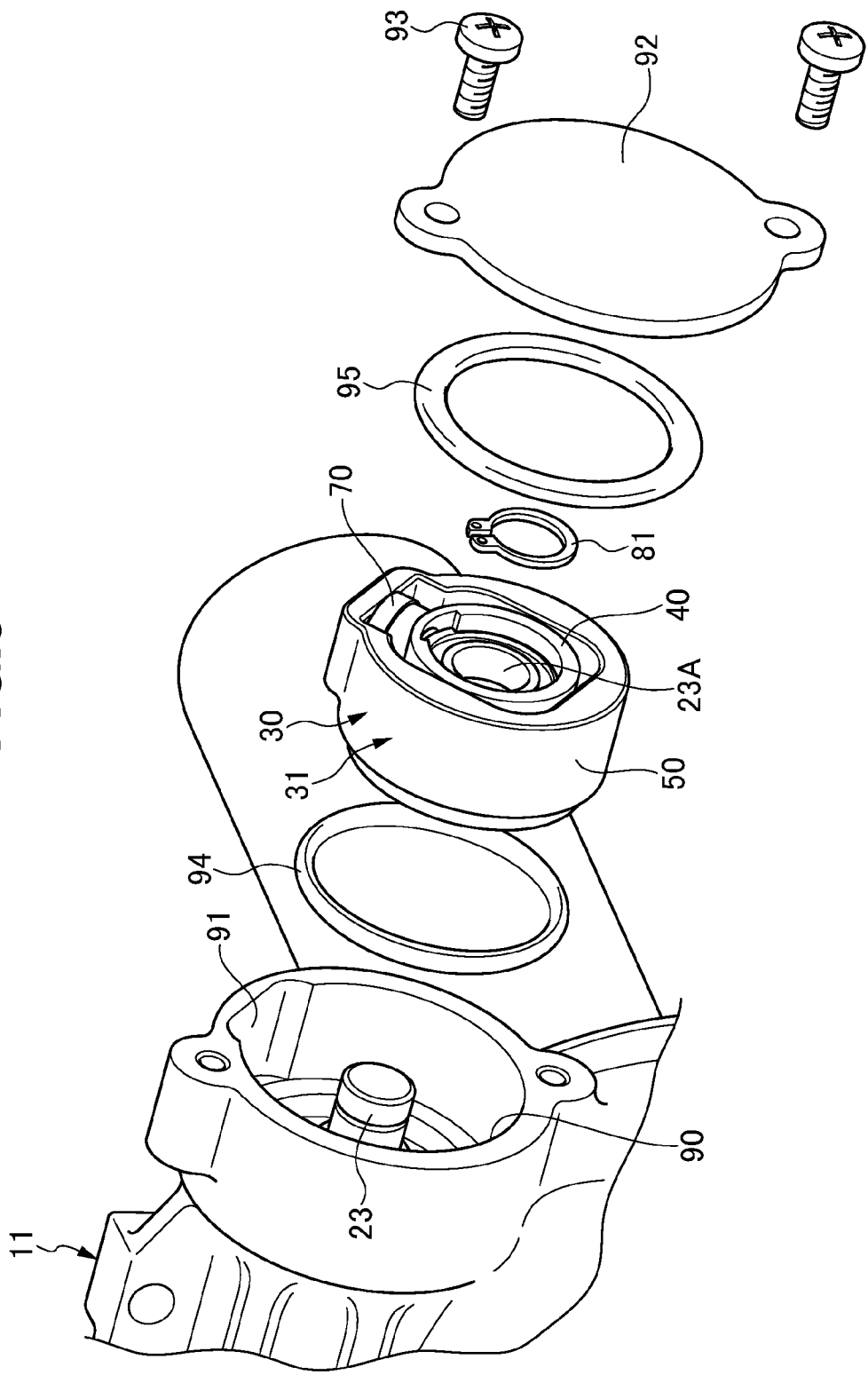
FIG. 5 is a perspective view showing a gear housing and a preload means.

The preload means 30 has a bearing case 40, a guide case 50 and a spring 60 as shown in FIG. 5, FIG. 6A and FIG. 6B. In the present embodiment, the preload means 30 further has a bump stopper rubber 70.

Figure 7:
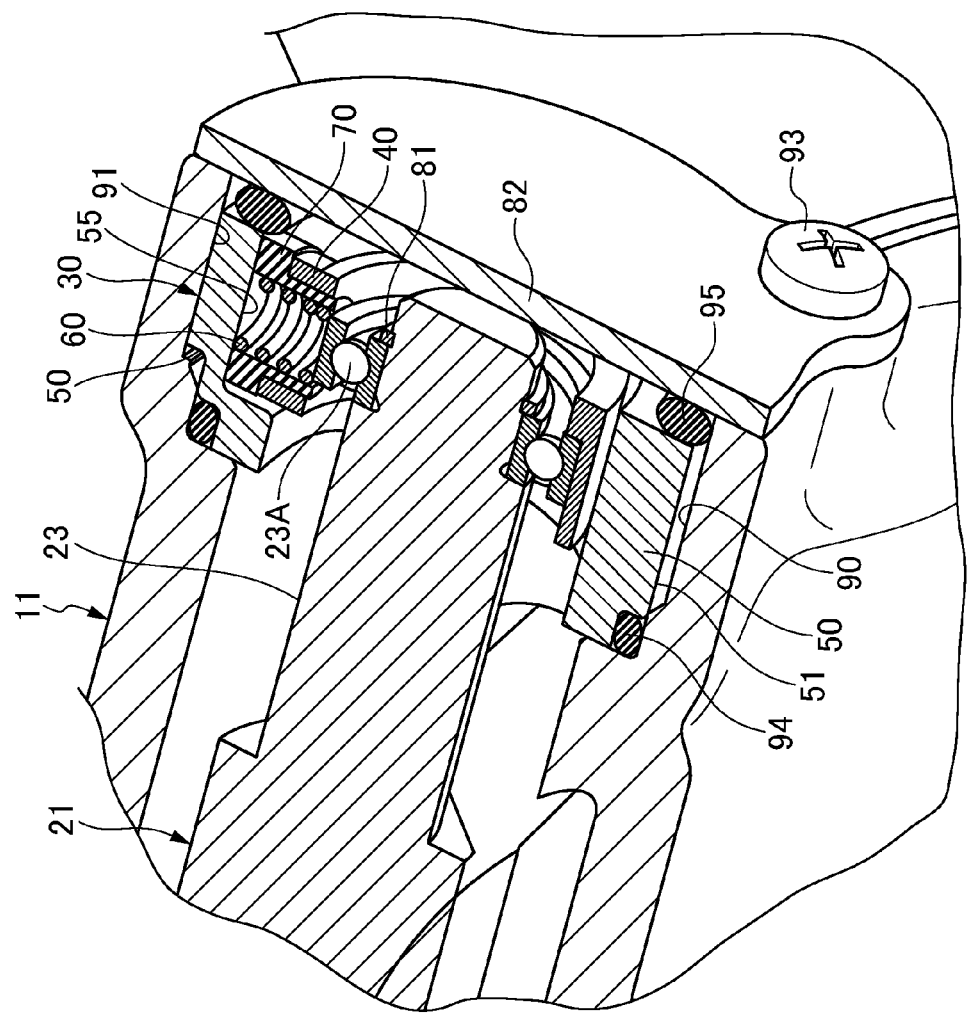
FIG. 7 is a cross sectional view showing an assembled state of the preload means.
Figure 8A:
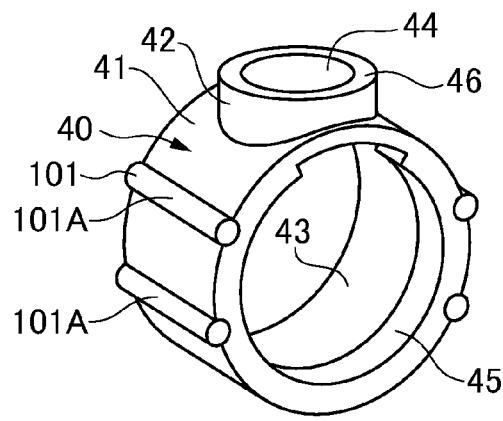
Figure 8B:
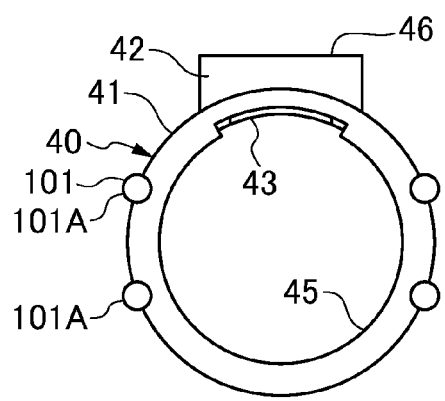
Figure 8C:
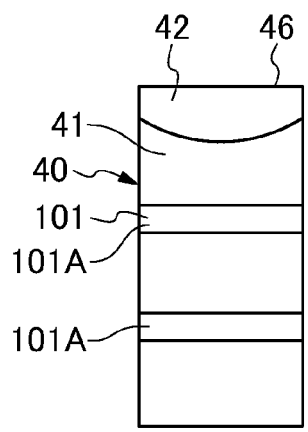

The bearing case 40 is constructed approximately by a cylinder body 41, as shown in FIG. 6A, FIG. 6B and FIG. 7, and a short cylinder protruding portion 42 is protruded outward in a radial direction from one position in a peripheral direction of an outer periphery of the cylinder body 41. The bearing case 40 is provided in an inner periphery of the cylinder body 41 with a round hole shaped bearing accommodating hole 43 which accommodates in a press fit state the bearing 23A for the shaft portion 23 of the worm gear 21. Further, the bearing case 40 is provided in a protruding portion 42 with a round hole shaped spring accommodating hole 44 which accommodates a spring for energizing the bearing 23A, that is, a coil spring 60 in the present embodiment, in such a manner as to cross one position in a peripheral direction of the bearing accommodating hole 43. The bearing accommodating hole 43 is formed so as to pass through in an axial direction of the cylinder body 41, and the spring accommodating hole 44 is formed so as to pass through in an axial direction of the protruding portion 42 which corresponds to a radial direction of the cylinder body 41.

The bearing accommodating hole 43 of the bearing case 40 is provided with an annular step portion 45 having a small inner diameter in a side which is far from the engagement portion between the worm gear 21 and the worm wheel 29 in the axial direction, and an outer ring of the bearing 23A is loaded to a side having a large inner diameter which is not provided with the annular step portion 45. One end of the outer ring of the bearing 23A comes into contact with a step end surface of the annular step portion 45. The inner ring of the bearing 23A is pinched by and fixed to a step end surface which is provided in the small diameter end of the shaft portion 23 of the worm gear 21, and a stop ring 81 which is locked and attached to the small diameter end portion of the shaft portion 23.

The spring accommodating hole 44 provided in the protruding portion 42 of the bearing case 40 loads the bump stopper rubber 70 together with a spring 60, in the present embodiment. In other words, a small outer diameter portion coming to a just below portion of a flange 71 in the tubular bump stopper rubber 70 is loaded to the spring accommodating hole 44. A leading end surface of a small outer diameter portion of the bump stopper rubber 70 comes into contact with an outer peripheral surface of the outer ring of the bearing 23A. The flange 71 of the bump stopper rubber 70 can be retained between a receiving surface 46 which an end surface around the spring accommodating hole 44 provided in the protruding portion 42 of the bearing case 40 forms, and a receiving surface 55 which is provided in a concave portion 54 in an inner periphery of a guide hole 53 mentioned below of the guide case 50. In accordance with this, the bump stopper rubber 70 is pinched between an outer peripheral surface of the outer ring of the bearing 23A and the receiving surface 55 in the inner periphery of the guide case 50, and can elastically absorb a shocking inverse input from a wheel side.

At this time, the spring 60 is inserted into a hollow portion of the bump stopper rubber 70 which is accommodated in the spring accommodating hole 44 of the bearing case 40. The spring 60 is pinched between the outer peripheral surface of the outer ring of the bearing 23A and the receiving surface 55 in the inner periphery of the guide case 50, and can energize the bearing 23A in the predetermined preload direction.

In this case, in the bearing case 40, a portion in which the spring accommodating hole 44 of the bearing accommodating hole 43 is open is formed as a lack portion of the annular step portion 45, and prevents the annular step portion 45 from forming an obstacle to a contact between the spring 60 and the bump stopper rubber 70, and the outer peripheral surface of the outer ring of the bearing 23A.

The bearing case 40 is provided with a guided portion 101 in both side outer peripheries with respect to a diameter line of the cylinder body 41 which corresponds to a center axis of the protruding portion 42 and the spring accommodating hole 44. A specific shape of the guided portion 101 will be mentioned later.

The guide case 50 is constructed, as shown in FIG. 6A and FIG. 6B, approximately by a cylinder body 51, and is provided with a protruding portion 52 at one position in a peripheral direction of an outer periphery of the cylinder body 51. The guide case 50 is provided in an inner periphery of the cylinder body 51 with a guide hole 53 which accommodates the bearing case 40. The guide case 50 is structured such that the guide hole 53 is formed approximately as a rectangular hole shape, and a guide surface 102 is formed in two opposite surfaces in an inner periphery of the guide hole 53. The guide surface 102 of the guide case 50 guides the bearing case 40 in such a manner that a guided portion 101 of the bearing case 40 is transition fitted so as to come into contact, and the bearing case 40 moves in the predetermined preload direction of the bearing 23A.

The guide case 50 is structured such that a concave portion 54 is formed in one surface of the other two surfaces in which the guide surface 102 in the inner periphery of the guide hole 53 is not formed, in the inner surface side of the protruding portion 52, and the protruding portion 42 of the bearing case 40 and the flange 71 of the bump stopper rubber 70 are loaded to the concave portion 54. The concave portion 54 is structured such as to be provided with the receiving surface 55 which supports the spring 60 and the bump stopper rubber 70.

The preload means 30 is structured such that the bearing case 40 is constructed by an oilless bush which is made of plastic such as an oil retaining polyacetal resin, and the guide case 50 is made of metal such as an iron sintered alloy.

The preload means 30 is structured such that the guide surface 102 provided in the guide hole 53 of the guide case 50 is formed as two flat shaped guide surfaces 102 which are opposed to each other so as to be in parallel. Further, each of the guided portions 101 of the bearing case 40 which is transition fitted to each of the guide surfaces 102 of the guide case 50 so as to come into contact is constructed by two convex portions 101A which are adjacent to each other along the preload direction to be applied to the bearing 23A of the worm gear 21. The convex portion 101A of the present embodiment is formed as a circular cylinder surface shape which is extended over a whole width of the cylinder body 41 along the axial direction of the cylinder body 41, on an outer periphery of the cylinder body 41 in the bearing case 40, as shown in FIG. 8A to FIG. 8C, and FIG. 9A. The convex portion 101A may be formed by a surplus circular arc of a Teflon (registered trade mark) pin after embedding a part of a circular arc of the Teflon (registered trade mark) pin to a concave portion provided in the outer periphery of the cylinder body 41.

Figure 9A:
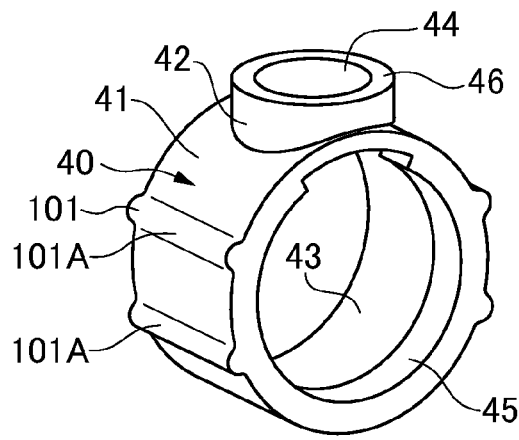
Figure 9B:
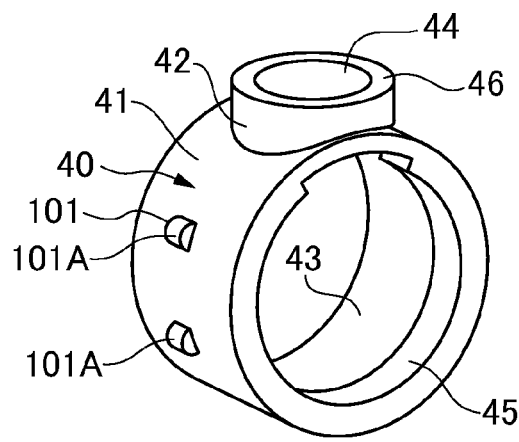
Figure 9C:
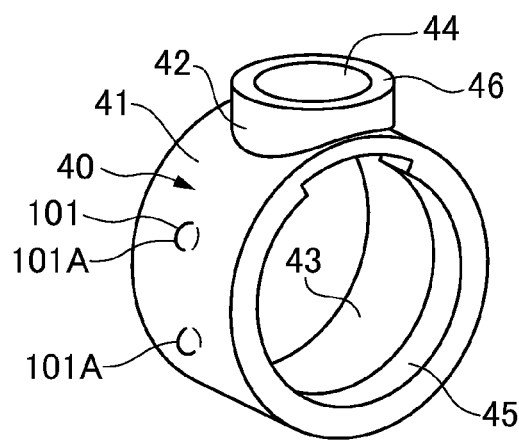

In this case, the convex portion 101A coming to each of the guided portions 101 which are provided in the outer peripheries in both sides of the bearing case 40 may be formed as a short circular cylinder surface shape which is provided only in the center in a width direction of the cylinder body 41 as shown in FIG. 9B, or may be formed as a spherical shape which is provided in the center in the width direction of the cylinder body 41 as shown in FIG. 9C.

The preload means 30 is structured such that the bearing case 40 in which the spring 60 and the bump stopper rubber 70 are accommodated as mentioned above is accommodated in the guide case 50, as a sub assembly 31 as shown in FIG. 5, FIG. 6A and FIG. 6B. Further, the guide case 50 in a state of the sub assembly 31 is loaded to a hole-like attaching portion 90 which is provided in the gear housing 11. The attaching portion 90 of the gear housing 11 is provided in a part in a peripheral direction of the hole surface with a concave positioning portion 91 for the guide case 50. The protruding portion 52 mentioned above of the guide case 50 is formed as a positioned portion which is engaged with the concave positioning portion 91 of the gear housing 11. A guide direction of the guided portion 101 of the bearing case 40 by the guide surface 102 of the guide case 50 is set to the predetermined preload direction of the bearing 23A of the worm gear 21, by engaging the protruding portion 52 of the guide case 50 with the concave positioning portion 91 of the gear housing 11, and positioning the attaching position of the guide case 50 with respect to the attaching portion 90 of the gear housing 11.

In a state in which the guide case 50 in the sub assembly 31 is loaded to the attaching portion 90 of the gear housing 11, a lid plate 92 closes an opening of the attaching portion 90 by a bolt 93. At this time, between the attaching portion 90 of the gear housing 11 and the guide case 50, there are provided with a diametrical direction pressing means 94 which presses the guide case 50 in a diametrical direction so as to define a position in a diametrical direction of the guide case 50 with respect to the gear housing 11, and an axial direction pressing means 95 which presses the guide case 50 in an axial direction so as to define a position in an axial direction of the guide case 50 with respect to the gear housing 11.

In the present embodiment, the diametrical direction pressing means 94 and the axial direction pressing means 95 are constructed by an O-ring. The diametrical direction pressing means 94 is loaded to a small diameter step portion which is provided in the outer periphery in one end side of the cylinder body 51 of the guide case 50, and is inserted into and attached to an inner periphery of the small diameter hole portion in a far side of the attaching portion 90 of the gear housing 11 in a compressed state in the diametrical direction, as shown in FIG. 7. The axial direction pressing means 95 is pinched by an end surface in another end side of the cylinder body 51 of the guide case 50 and the lid plate 92 and is inserted and loaded in a compressed state in the axial direction, as shown in FIG. 7.

Accordingly, in the case of embedding the worm gear 21 in the motor-driven power steering apparatus 10, the sub assembly 31 of the preload means 30 mentioned above is loaded to the attaching portion 90 of the gear housing 11. At this time, the protruding portion 52 which the guide case 50 of the sub assembly 31 is provided with is engaged with the concave positioning portion 91 of the attaching portion 90 of the gear housing 11. The guide direction of the guided portion 101 of the bearing case 40 by the guide surface 102 of the guide case 50 is set to the predetermined preload direction of the bearing 23A of the worm gear 21. Further, the attaching position in the diametrical direction of the guide case 50 with respect to the gear housing 11 is defined by the diametrical direction pressing means 94.

Further, the worm gear 21 in which the bearing 22A and the coupling 25 are inserted into and attached to the shaft portion 22 is inserted into the gear housing 11. The shaft portion 23 of the worm gear 21 is inserted into the bearing 23A which has been embedded in the sub assembly 31 of the preload means 30, and the stop ring 81 mentioned above is locked and attached to the small diameter end portion of the shaft portion 23. Further, the bearing 22A which is inserted into and attached to the shaft portion 22 of the worm gear 21 is fixed to the step hole of the gear housing 11, by the bearing nut 27 mentioned above which is threadably attached to the gear housing 11. The worm gear 21 can somewhat oscillate around the position in the vicinity of the center in the axial direction of the bearing 22A. The opening of the attaching portion 90 of the gear housing 11 is closed by the lid plate 92, and the attaching position in the axial direction of the guide case 50 with respect to the gear housing 11 is defined by the axial direction pressing means 95.

In accordance with this, the spring 60 which is accommodated in the sub assembly 31 of the preload means 30 energizes the bearing 23A of the worm gear 21 in the predetermined preload direction. The worm gear 21 oscillates around the position in the vicinity of the center in the axial direction of the bearing 22A by the spring force of the spring 60, whereby the preload can be applied to the engagement portion between the worm gear 21 and the worm wheel 29, and the backlash of the engagement portion can be done away with. Further, since the preload means 30 correctly moves the bearing 23A of the worm gear 21 in the predetermined preload direction, on the basis of existence of the guided portion 101 (convex portion 101A) of the bearing case 40, and the guide surface 102 of the guide case 50, the worm gear 21 can retain an appropriate engagement position with respect to an axial length direction of the worm wheel 29, and can smoothly carry out a movement in the radial direction of the worm gear 21 on the basis of a fluctuation of an engagement reaction force.

Therefore, in accordance with the motor-driven power steering apparatus 10, the following operations and effects can be achieved.

(a) The preload means 30 has the bearing case 40 and the guide case 50. The bearing case 40 is provided with the bearing accommodating hole 43 which accommodates the bearing 23A of the worm gear 21, is provided with the spring accommodating hole 44 which accommodates the spring 60 for energizing the bearing 23A so as to cross the bearing accommodating hole 43, and is provided in the outer periphery with the guided portion 101. The guide case 50 is provided with the guide hole 53 which accommodates the bearing case 40, and is provided in the inner periphery of the guide hole 53 with the guide surface 102 which comes into contact with the guided portion 101 of the bearing case 40 so as to guide in such a manner that the bearing case 40 moves in the predetermined preload direction of the bearing 23A. Further, the guide case 50 accommodating the bearing case 40 in which the bearing 23A and the spring 60 are accommodated is attached to the attaching portion 90 which is provided in the gear housing 11.

In other words, the preload means 30 is previously arranged in a state of the sub assembly 31 that the bearing case 40 in which the bearing 23A and the spring 60 are accommodated is accommodated in the guide case 50. Assembly is completed by attaching the guide case 50 in the state of the sub assembly 31 to the attaching portion 90 of the gear housing 11, whereby an assembling characteristic can be improved.

Further, since the spring 60 is accommodated in the spring accommodating hole 44 of the bearing case 40, it is possible to form the sub assembly 31 in which the spring 60 is stably embedded without any risk of falling. Further, it is possible to accommodate the spring 60 having a large dimension while making a whole structure of the preload means 30 small in diameter and compact in size, by structuring the spring 60 such as to come into direct contact with the bearing 23A and energize. It is possible to hold down a deformation of the bearing case 40 at such a degree that the spring 60 does not press the bearing 23A via the bearing case 40 and improve durability thereof.

(b) The bearing case 40 is made of plastic, and the guide case 50 is made of metal. In accordance with this, it is possible to improve a sliding performance of the guided portion 101 of the bearing case 40 with respect to the guide surface 102 of the guide case 50.

(c) The guide direction of the bearing case 40 by the guide case 50 is set to the predetermined preload direction of the bearing 23A by providing the concave positioning portion 91 for the guide case 50 in the attaching portion 90 of the gear housing 11, engaging the protruding portion 52 (positioned portion) provided in the guide case 50 with the concave positioning portion 91, and positioning the attaching position of the guide case 50 with respect to the attaching portion 90 of the gear housing 11. In accordance with this, it is possible to energize the bearing 23A of the worm gear 21 in the predetermined preload direction while easily setting the assembling direction of the preload means 30 with respect to the gear housing 11.

(d) Two flat surface shaped guide surfaces 102 which are opposed to each other so as to be in parallel are provided in the inner periphery of the guide hole 53 of the guide case 50. Each of the guided portions 101 of the bearing case 40 which comes into contact with each of the guide surfaces 102 of the guide case 50 is constructed by two convex portions 101A which are adjacent to each other along the preload direction of the bearing 23A. Since two points constructed by the respective two convex portions 101A (respective guided portions 101) in both sides of the bearing case 40 come into contact with the respective flat surface shaped guide surfaces 102 in both sides of the guide case 50 so as to be guided, the bearing case 40 is prevented from turning around its own axis with respect to the guide case 50. The bearing 23A of the worm gear 21 can be stably energized in the predetermined preload direction without any centrifugal whirling or any abnormal noise.

The convex portion 101A (guided portion 101) of the bearing case 40 is brought into contact with the flat surface shaped guide surface 102 of the guide case 50 so as to be guided, and generation of the abnormal noise is suppressed by making the gap between the guided portion 101 and the guide surface 102 small. At the same time, friction between the guided portion 101 and the guide surface 102 is made smaller by setting the number of the convex portions 101A coming to the guided portion 101 of the bearing case 40 to two in one side, and suppressing a surface pressure between the guided portion 101 and the guide surface 102 from becoming too large, whereby it is possible to lightly move and guide the bearing case 40 with respect to the guide case 50 on the basis of the spring force of the spring 60.

(e) The tubular bump stopper rubber 70 is loaded to the spring accommodating hole 44 of the bearing case 40. The bump stopper rubber 70 can be retained between the receiving surface 46 which is provided around the spring accommodating hole 44 of the bearing case 40 and the receiving surface 55 which is provided in the inner periphery of the guide case 50. When the steering reaction force serving as the inverse input caused by collision of the wheel at a curb or the like is going to shockingly make the worm wheel 29 and the worm gear 21 engaging with the worm wheel 29 displace in the radial direction, the bump stopper rubber 70 can elastically absorb the displacement and reduce the shock.

At this time, it is possible to make a whole structure of the preload means 30 small in diameter and compact in size by accommodating the spring 60 in the inner diameter portion of the bump stopper rubber 70.

(f) In the case that the spring 60 accommodated in the inner diameter portion of the bump stopper rubber 70 in the item (e) mentioned above is constructed by the coil spring, it is possible to make a whole structure of the preload means 30 using the coil spring small in diameter and compact in size.

(g) Between the attaching portion 90 of the gear housing 11 and the guide case 50, there are provided with the diametrical direction pressing means 94 which presses the guide case 50 in the diametrical direction so as to define the position in the diametrical direction of the guide case 50, and the axial direction pressing means 95 which presses the guide case 50 in the axial direction so as to define the position in the axial direction of the guide case 50. In accordance with this, it is possible to easily attach the guide case 50 to the attaching portion 90 of the gear housing 11 with no play.

(h) Since the diametrical direction pressing means 94 and the axial direction pressing means 95 in the item (g) mentioned above are constructed by the O-ring, it is possible to further simplify the attaching structure of the guide case 50.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention. For example, the bearing of the drive gear (worm gear) is not limited to the rolling bearing, but may be constructed by a slide bearing.

The drive gear is not limited to the worm gear, and the driven gear is not limited to the worm wheel, but the drive gear may be constructed by a hypoid pinion, and the driven gear may be constructed by a hypoid wheel. Further, a bevel gear may be used in the drive gear and the driven gear.

In accordance with the present invention, there is provided a motor-driven power steering apparatus comprising a drive gear driven by an electric motor. The drive gear is pivoted to a gear housing. A driven gear engages with the drive gear, the driven gear being fixed to a steering shaft; and a preload means energizing a bearing of the drive gear in a predetermined preload direction in such a manner as to apply a preload to an engagement portion between the drive gear and the driven gear. The preload means comprises a bearing case which is provided with a bearing accommodating hole accommodating the bearing of the drive gear, is provided with a spring accommodating hole accommodating a spring for energizing the bearing so as to cross the bearing accommodating hole, and is provided in an outer periphery with a guided portion. A guide case is provided with a guide hole accommodating the bearing case, and is provided in an inner periphery of the guide hole with a guide surface coming into contact with the guided portion of the bearing case and guiding in such a manner that the bearing case moves in a predetermined preload direction of the bearing. The guide case accommodating the bearing case in which the bearing and the spring are accommodated is attached to an attaching portion which is provided in the gear housing. Accordingly, it is possible to improve an assembling characteristic of a preload means with respect to a gear housing, in a motor-driven power steering apparatus having a preload means for removing a backlash between a drive gear and a driven gear.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. A motor-driven power steering apparatus comprising:
a drive gear driven by an electric motor, the drive gear being pivoted to a gear housing;
a driven gear engaging with the drive gear, the driven gear being fixed to a steering shaft; and
a preload means energizing a bearing of the drive gear in a predetermined preload direction in such a manner as to apply a preload to an engagement portion between the drive gear and the driven gear,
wherein the preload means comprises:
a bearing case which is provided with a bearing accommodating hole accommodating the bearing of the drive gear, is provided with a spring accommodating hole accommodating a spring for energizing the bearing so as to cross the bearing accommodating hole, and is provided in an outer periphery with a guided portion; and
a guide case which is provided with a guide hole accommodating the bearing case, and is provided in an inner periphery of the guide hole with a guide surface coming into contact with guided portions of the bearing case and guiding in such a manner that the bearing case moves in a predetermined preload direction of the bearing, and wherein the guide case accommodating the bearing case in which the bearing and the spring are accommodated is attached to an attaching portion which is provided in the gear housing.

2. The motor-driven power steering apparatus according to claim 1, wherein the bearing case is made of plastic, and the guide case is made of metal.

3. The motor-driven power steering apparatus according to claim 2, wherein a positioning portion for the guide case is provided in the attaching portion of the gear housing, a positioned portion provided in the guide case is engaged with the positioning portion, and a guide direction of the bearing case by the guide case is set to the predetermined preload direction of the bearing by positioning the attaching position of the guide case with respect to the attaching portion of the gear housing.

4. The motor-driven power steering apparatus according to claim 3, wherein two flat surface shaped guide surfaces which are opposed to each other so as to be in parallel are provided in the inner periphery of the guide hole of the guide case, and wherein the guided portions of the bearing case coming into contact with each of the guide surfaces of the guide case is constructed by two convex portions which are adjacent to each other along the preload direction of the bearing.

5. The motor-driven power steering apparatus according to claim 3, wherein a tubular bump stopper rubber is loaded to the spring accommodating hole of the bearing case, and the bump stopper rubber is structured such as to be retainable between a receiving surface which is provided around the spring accommodating hole of the bearing case and a receiving surface which is provided in the inner periphery of the guide case, and wherein the spring is accommodated in an inner diameter portion of the bump stopper rubber.

6. The motor-driven power steering apparatus according to claim 2, wherein two flat surface shaped guide surfaces which are opposed to each other so as to be in parallel are provided in the inner periphery of the guide hole of the guide case, and wherein the guided portions of the bearing case coming into contact with each of the guide surfaces of the guide case is constructed by two convex portions which are adjacent to each other along the preload direction of the bearing.

7. The motor-driven power steering apparatus according to claim 2, wherein a tubular bump stopper rubber is loaded to the spring accommodating hole of the bearing case, and the bump stopper rubber is structured such as to be retainable between a receiving surface which is provided around the spring accommodating hole of the bearing case and a receiving surface which is provided in the inner periphery of the guide case, and wherein the spring is accommodated in an inner diameter portion of the bump stopper rubber.

8. The motor-driven power steering apparatus according to claim 7, wherein the spring is constructed by a coil spring.

9. The motor-driven power steering apparatus according to claim 2, wherein between the attaching portion of the gear housing and the guide case, there are provided a diametrical direction pressing means which presses the guide case in a diametrical direction so as to define a position in a diametrical direction of the guide case, and an axial direction pressing means which presses the guide case in an axial direction so as to define a position in an axial direction of the guide case.

10. The motor-driven power steering apparatus according to claim 1, wherein a positioning portion for the guide case is provided in the attaching portion of the gear housing, a positioned portion provided in the guide case is engaged with the positioning portion, and a guide direction of the bearing case by the guide case is set to the predetermined preload direction of the bearing by positioning the attaching position of the guide case with respect to the attaching portion of the gear housing.

11. The motor-driven power steering apparatus according to claim 10, wherein two flat surface shaped guide surfaces which are opposed to each other so as to be in parallel are provided in the inner periphery of the guide hole of the guide case, and wherein the guided portions of the bearing case coming into contact with each of the guide surfaces of the guide case is constructed by two convex portions which are adjacent to each other along the preload direction of the bearing.

12. The motor-driven power steering apparatus according to claim 10, wherein a tubular bump stopper rubber is loaded to the spring accommodating hole of the bearing case, and the bump stopper rubber is structured such as to be retainable between a receiving surface which is provided around the spring accommodating hole of the bearing case and a receiving surface which is provided in the inner periphery of the guide case, and wherein the spring is accommodated in an inner diameter portion of the bump stopper rubber.

13. The motor-driven power steering apparatus according to claim 1, wherein two flat surface shaped guide surfaces which are opposed to each other so as to be in parallel are provided in the inner periphery of the guide hole of the guide case, and wherein the guided portions of the bearing case coming into contact with each of the guide surfaces of the guide case is constructed by two convex portions which are adjacent to each other along the preload direction of the bearing.

14. The motor-driven power steering apparatus according to claim 13, wherein the bearing case is constructed approximately as a cylinder body; and wherein the convex portion is formed as a circular cylinder surface shape which is extended over a whole width of the cylinder body along an axial direction of the cylinder body on an outer periphery of the cylinder body in the bearing case.

15. The motor-driven power steering according to claim 13, wherein the bearing case is constructed approximately as a cylinder body, and wherein the convex portion is formed as a short circular cylinder surface shape which is provided only in a center in a width direction of the cylinder body on an outer periphery of the cylinder body in the bearing case.

16. The motor-driven power steering apparatus according to claim 13, wherein the bearing case is constructed approximately as a cylinder body, and wherein the convex portion is formed as a spherical shape which is provided in a center in a width direction of the cylinder body on an outer periphery of the cylinder body in the bearing case.

17. The motor-driven power steering apparatus according to claim 1, wherein a tubular bump stopper rubber is loaded to the spring accommodating hole of the bearing case, and the bump stopper rubber is structured such as to be retainable between a receiving surface which is provided around the spring accommodating hole of the bearing case and a receiving surface which is provided in the inner periphery of the guide case, and wherein the spring is accommodated in an inner diameter portion of the bump stopper rubber.

18. The motor-driven power steering apparatus according to claim 17, wherein the spring is constructed by a coil spring.

19. The motor-driven power steering apparatus according to claim 1, wherein between the attaching portion of the gear housing and the guide case, there are provided a diametrical direction pressing means which presses the guide case in a diametrical direction so as to define a position in a diametrical direction of the guide case, and an axial direction pressing means which presses the guide case in an axial direction so as to define a position in an axial direction of the guide case.

20. The motor-driven power steering apparatus according to claim 19, wherein the diametrical direction pressing means and the axial direction pressing means are constructed by an O-ring.

* * * * *